(12) United States Patent
Lissianski et al.

(10) Patent No.: US 7,452,517 B2
(45) Date of Patent: Nov. 18, 2008

(54) INTEGRATED APPROACH TO REDUCTION OF MERCURY EMISSIONS

(75) Inventors: Vitali Lissianski, San Juan Capistrano, CA (US); Randy Seeker, San Clemente, CA (US); Peter M. Maly, Lake Forest, CA (US)

(73) Assignee: General Electric Company, Schnectady, NY (US)

( * ) Notice: Subject to any disclaimer, the term of this patent is extended or adjusted under 35 U.S.C. 154(b) by 398 days.

(21) Appl. No.: 11/164,713

(22) Filed: Dec. 2, 2005

(65) Prior Publication Data

US 2007/0128096 A1 Jun. 7, 2007

(51) Int. Cl.
*B01D 53/64* (2006.01)
*F23J 3/00* (2006.01)
*F23J 15/00* (2006.01)

(52) U.S. Cl. .................. 423/210; 423/235; 423/246; 422/105; 422/108; 422/111; 110/186; 110/203; 110/216; 110/345

(58) Field of Classification Search ........... 423/210, 423/235, 246; 422/105, 108, 111; 110/186, 110/203, 216, 345
See application file for complete search history.

(56) References Cited

U.S. PATENT DOCUMENTS

| | | | |
|---|---|---|---|
| 3,849,267 A | 11/1974 | Hilgen et al. ............... 204/99 |
| 5,900,042 A | 5/1999 | Mendelsohn et al. .......... 75/742 |
| 6,726,888 B2 * | 4/2004 | Lanier et al. ................... 423/99 |
| 6,855,859 B2 | 2/2005 | Nolan et al. ................. 588/236 |
| 6,863,005 B2 * | 3/2005 | Lanier et al. ................. 110/345 |
| 6,895,875 B1 * | 5/2005 | Lissianski et al. ........... 110/345 |
| 6,981,456 B2 * | 1/2006 | Lissianski et al. ........... 110/345 |
| 7,270,063 B2 * | 9/2007 | Aradi et al. .................. 110/345 |
| 2002/0068030 A1 | 6/2002 | Nolan et al. |
| 2003/0143128 A1 * | 7/2003 | Lanier et al. ................. 422/171 |
| 2004/0134396 A1 * | 7/2004 | Lanier et al. ................. 110/345 |
| 2005/0103243 A1 * | 5/2005 | Lissianski et al. ........... 110/345 |
| 2005/0129600 A1 * | 6/2005 | Lanier et al. ................. 423/239.1 |
| 2005/0158223 A1 * | 7/2005 | Lissianski et al. ........... 423/210 |
| 2006/0021554 A1 * | 2/2006 | Lissianski et al. ........... 110/345 |
| 2006/0120934 A1 * | 6/2006 | Lanier et al. ................. 423/210 |

OTHER PUBLICATIONS

Jarvis, et al., "LoTOx™ Process Flexibility and Multi-Pollutant Control Capability," *Combined Power Plant Air Pollutant Control Maga Symposium*, Paper No. 147, Washington D.C., (May 2003).

* cited by examiner

*Primary Examiner*—Timothy C Vanoy
(74) *Attorney, Agent, or Firm*—Sutherland (57) ABSTRACT

Method for reducing mercury emissions from coal-fired combustion comprising staging of a combustion unit to remove mercury with fly ash from the flue gas, introducing activated carbon to remove mercury from the flue gas, and collecting the fly ash, activated carbon, and associated mercury in a particulate control device.

52 Claims, 7 Drawing Sheets

INTEGRATED APPROACH TO REDUCTION OF MERCURY EMISSIONS

FIELD OF INVENTION

This invention relates to combustion of coal in a coal-fired combustion unit. In particular, this invention relates to a method for reducing mercury emissions from a coal-fired combustion system.

BACKGROUND OF INVENTION

Coal-fired combustion is one of the major sources of energy in the world today; however, it is also a source of major air pollutants such as mercury. With expectations being that the government will impose more stringent regulations on allowable levels of mercury emissions, utilities are actively seeking effective and inexpensive technologies for reducing mercury emissions.

It is commonly accepted that mercury volatizes during coal combustion. Thermodynamic calculations suggest that at combustion temperatures the mercury is present in flue gas in its elemental form ($Hg^0$). As flue gas temperatures cool below 1000° F., mercury is partially converted to the oxidized form ($Hg^{+2}$). The primary mechanism for mercury oxidation is through reactions with chlorine containing species, resulting in most oxidized mercury being present as $HgCl_2$. Typically, the extent of mercury oxidation in flue gas is greater for coals with higher chlorine content, such as bituminous coals, than for coals with lower chlorine content, such as low-rank coals.

Mercury can be adsorbed by the unburned carbon fly ash by forming a particulate bound mercury. Particulate bound mercury may be removed with other particulate matter by a particulate collection system. While elemental mercury is generally unreactive, oxidized mercury is more reactive than elemental mercury and water soluble, enabling removal of oxidized mercury by equipment such as wet desulfurization systems (wet-scrubbers), typically used to reduce $SO_2$ emissions. The efficiency of most mercury control technologies is therefore dependent on the type of mercury present in flue gas; the greater the oxidized mercury, the greater the efficiency of mercury removal.

The problem of controlling mercury emissions from coal-fired combustion has been addressed by activated carbon injection and mercury oxidation in flue gas by the addition of chlorine or other halogens. This, however, can be costly by requiring expensive additives and activated carbon to improve mercury emission reductions. Accordingly, there is a need for an efficient and economically desirable method for reducing mercury emissions from coal-fired combustion.

SUMMARY OF INVENTION

This invention addresses the above described need by providing a method to reduce mercury gas emissions from a coal-fired combustion system comprising a coal combustion unit and a first particulate control device downstream of the combustion unit. By combusting coal under staging conditions, the amount of mercury removed by unburned carbon fly ash in the flue gas is increased. The step of introducing activated carbon into the flue gas upstream of the particulate control device further increases the amount of mercury removed from the flue gas. The first particulate control device collects the fly ash, activated carbon and the associated mercury from the flue gas, significantly reducing mercury emissions in the flue gas. This integrated method combining several technologies is more economical and produces more desirable results than previously disclosed methods of controlling mercury emissions.

Other objects, features, and advantages of embodiments encompassed by this invention will be apparent from the following detailed description, drawing, and claims.

DETAILED DESCRIPTION OF INVENTION

Several embodiments of this invention are described below and are illustrated in the accompanying drawings. Reference numerals refer to various components of these embodiments and the same reference numerals refer to the same component present in different embodiments.

This invention encompasses a method for reducing mercury emissions from the combustion of coal in a coal-fired combustion system. A coal-fired combustion system 10 in accordance with an embodiment of this invention is illustrated schematically in FIG. 1 and comprises a coal-fired combustion unit 12 for the combustion of coal and a first particulate control device 14 downstream of the combustion unit. The particulate control device 14 is a technology well known to those skilled in the art, and includes but is not limited to fabric filters, electrostatic precipitators, and mechanical collectors.

Figure 1:
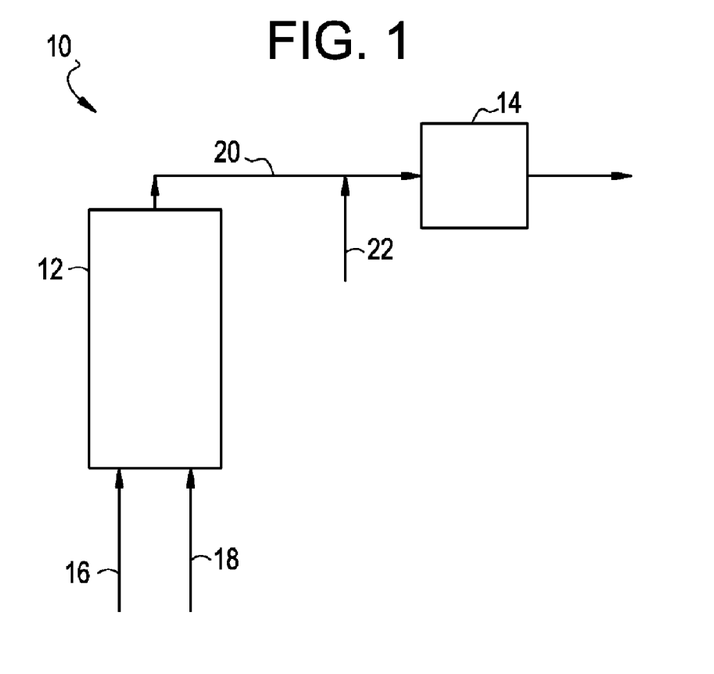
FIG. 1 is a schematic representation of a coal-fired combustion system in accordance with a first embodiment of this invention.

The combustion unit 12 has both a fuel supply 16 and an air supply 18. When the fuel 16 is combusted in the combustion unit 12 under staging conditions, mercury is released into the flue gas 20 generated by combustion and at least a portion of the mercury is removed by the unburned carbon in the fly ash of the flue gas 20. The carbon content in the fly ash is in the range of about 0.5% to about 50%, preferably in the range of about 5% to about 15%. Embodiments of staging conditions are described later in detail and illustrated in FIG. 6 and FIG. 7. The fly ash, and the mercury in the flue gas 20 are collected by the first particulate control device 14 to reduce the mercury present in the flue gas.

In accordance with another embodiment of a coal-fired combustion system 10, activated carbon 22 is introduced into the flue gas 20 downstream of the combustion unit 12 and upstream of the first particulate control device 14 to remove more mercury by adsorption of the mercury on the activated carbon. The fly ash, activated carbon 22, and the mercury in the flue gas 20 are collected by the first particulate control device 14 to reduce the mercury present in the flue gas.

Figure 2:
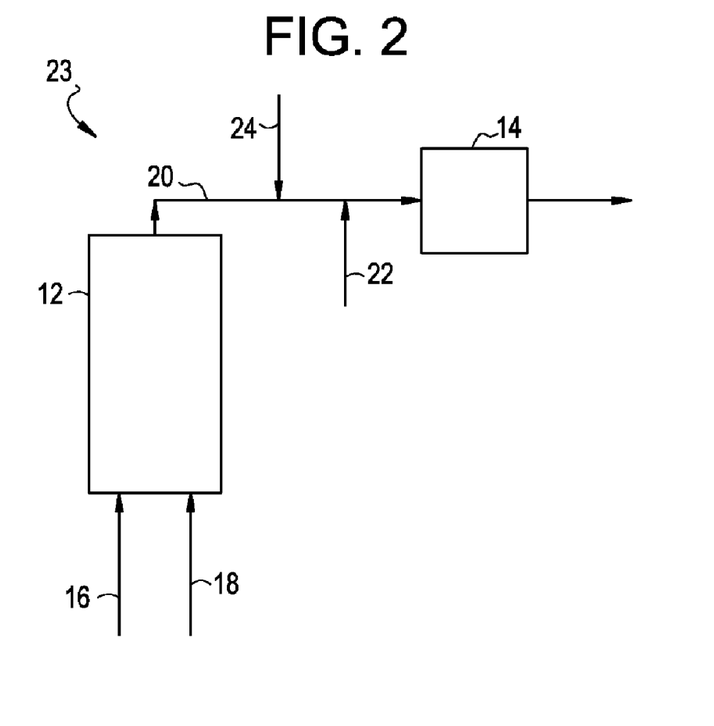
FIG. 2 is a schematic representation of a coal-fired combustion system in accordance with a second embodiment of this invention.

Another coal-fired combustion system 23 in accordance with a second embodiment of this invention is illustrated schematically in FIG. 2 and is similar to the first combustion system 10 in FIG. 1, except it further includes the introduction of one or more mercury-oxidizing additives 24 into the flue gas 20 downstream of the combustion unit 12 and upstream of the activated carbon introduction 22 and first particulate control device 14 to increase oxidation of the mercury in the flue gas 20. Suitable mercury-oxidizing additives 24 include but are not limited to $H_2O_2$, $NH_4Cl$, $CH_3OH$, and halogen-containing species. The success of mercury removal is improved by oxidizing elemental mercury because oxidized mercury is highly reactive while elemental mercury is unreactive, allowing the oxidized mercury to be removed more easily through adsorption. Thus, increasing the amount of oxidized mercury will increase the amount of oxidized mercury adsorbed by fly ash or activated carbon.

Figure 3:
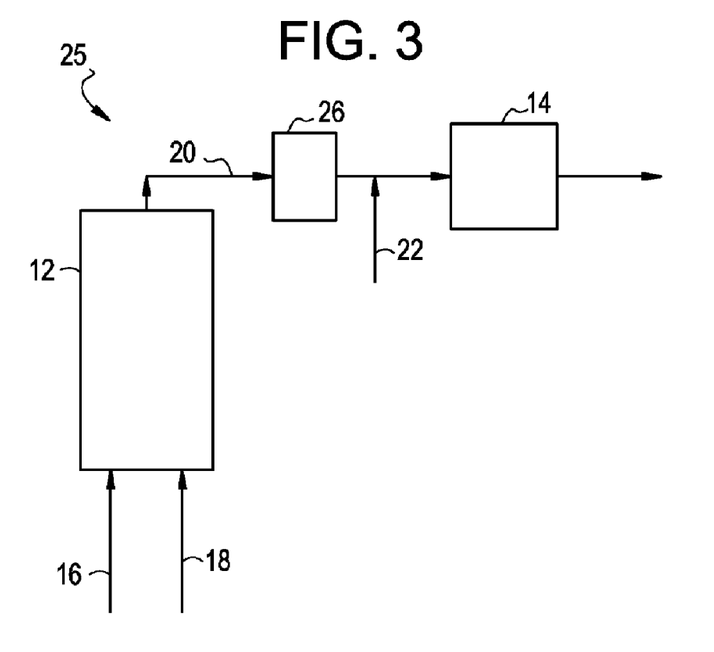
FIG. 3 is a schematic representation of a coal-fired combustion system in accordance with a third embodiment of this invention.

Still another coal-fired combustion system 25 in accordance with a third embodiment illustrated schematically in FIG. 3, cools the flue gas 20 in a cooling unit 26 downstream of the combustion unit 12 and upstream of the activated carbon introduction 22 and first particulate control device 14, thereby increasing removal of the mercury by the activated carbon 22. One possible embodiment of the cooling unit 26 is duct humidification. Not only is mercury more readily adsorbed on carbon in fly ash and activated carbon 22 at lower temperatures, but elemental mercury is also partially converted to oxidized mercury by lowering the temperature of the flue gas 20. As discussed previously, the oxidized mercury is more reactive than elemental mercury and therefore more easily removed from the flue gas 20.

Figure 4:
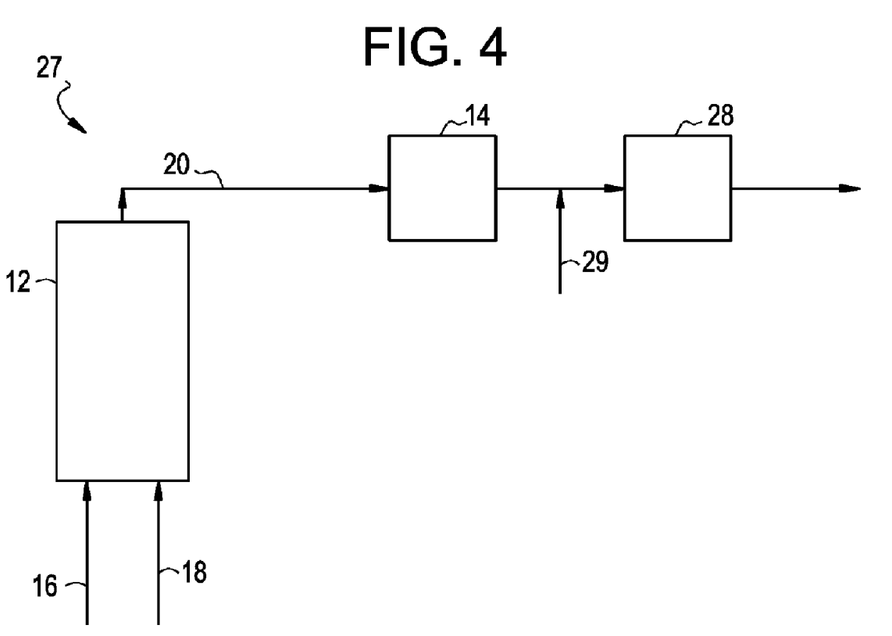
FIG. 4 is a schematic representation of a coal-fired combustion system in accordance with a fourth embodiment of this invention.

Yet another coal-fired combustion system 27 illustrated schematically in FIG. 4, comprises a second particulate control device 28 downstream of the first particulate control device 14. Activated carbon 29 is introduced downstream of the first particulate control device 14 and upstream of the second particulate control device 28 to further increase the removal of mercury by adsorption on the activated carbon.

Figure 5:
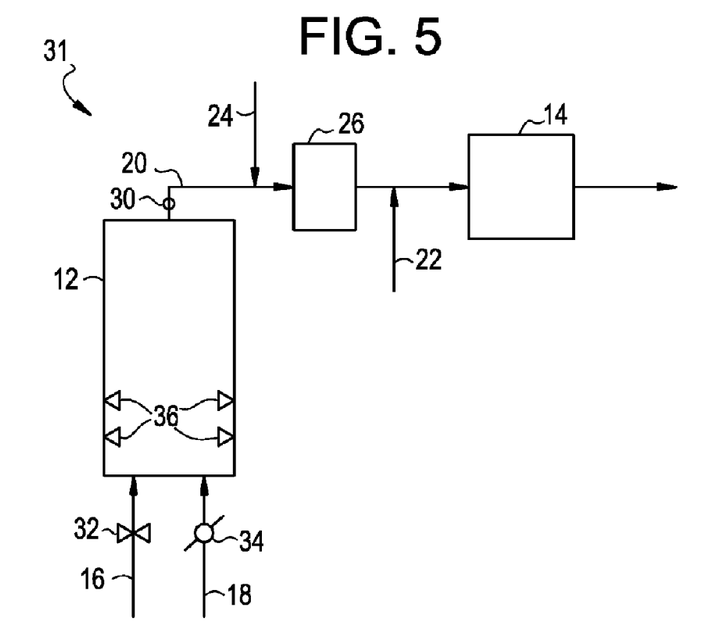
FIG. 5 is a schematic representation of a coal-fired combustion system in accordance with a fifth embodiment of this invention.

Another coal-fired combustion system 31 in accordance with a fifth embodiment, illustrated schematically in FIG. 5, optimizes combustion of coal in the combustion unit 12 under staging conditions to minimize CO, NOx, and mercury emissions. CO sensors 30 may be used to detect CO distribution in the flue gas 20, allowing control of the fuel supply 16 and air supply 18 by optimizing the combustion conditions in the combustion unit 12. Technologies available to control the fuel supply 16 and air supply 18 based on the CO distribution in the flue gas 20 include but are not limited to coal dampers 32 and air flow actuators 34. The coal-fired combustion system 31 may further comprise Low NOx burners 36 to create fuel-rich zones inside the combustion unit 12, decreasing the coal combusted and increasing the amount of unburned carbon in the flue gas 20. An increase in the amount of unburned carbon will also increase the amount of mercury removed from the flue gas 20.

Figure 6:
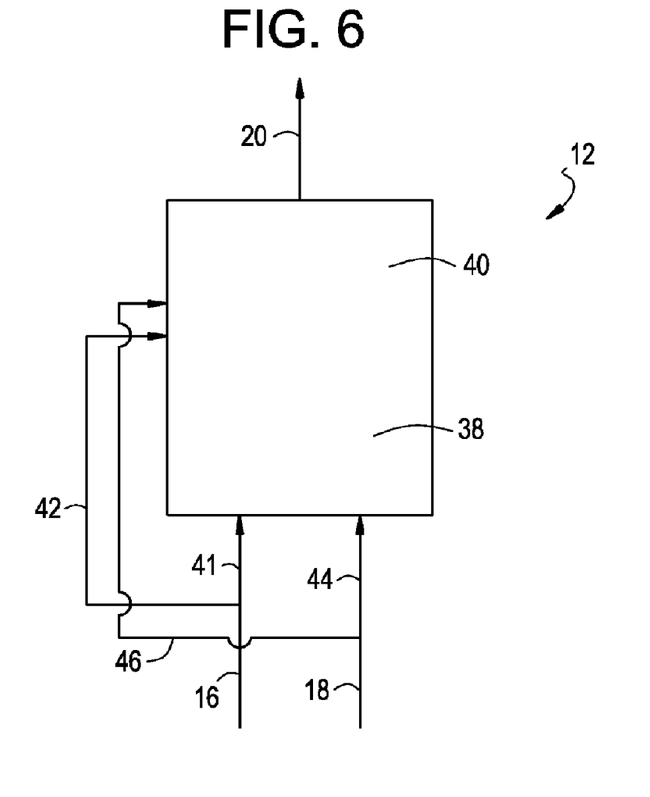
FIG. 6 is a schematic representation of staging of a coal-fired combustion unit in accordance with another embodiment of this invention.
Figure 7:
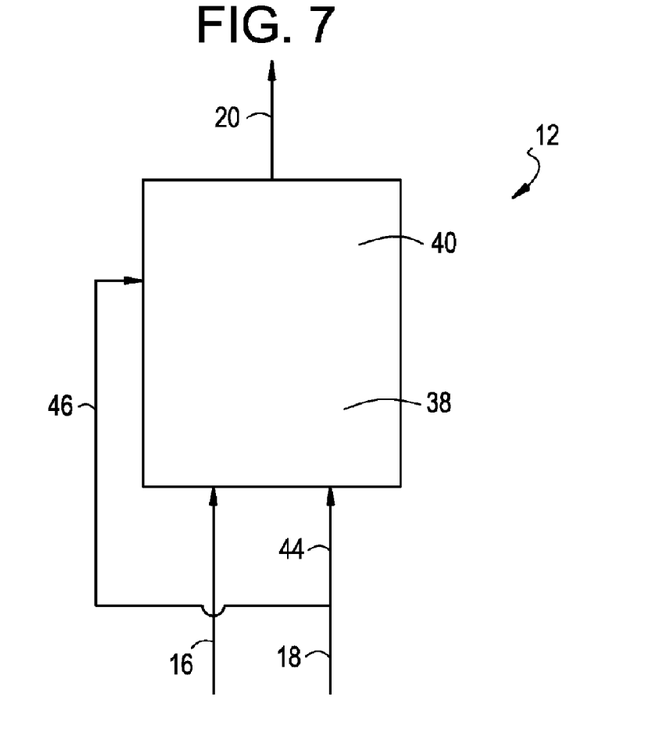
FIG. 7 is a schematic representation of staging of a coal-fired combustion unit in accordance with still another embodiment of this invention.
Figure 8:
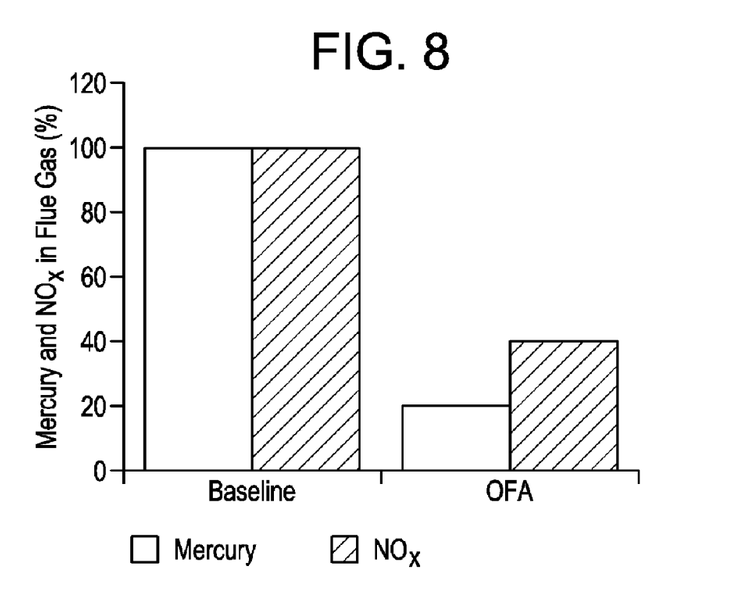
FIG. 8 is a graph showing the effect of air staging on mercury and NOx emissions.

Different embodiments of staging conditions in the combustion unit 12 are illustrated schematically in FIG. 6 and FIG. 7. Coal reburning (FIG. 6) is a two-stage fuel injection technology with a first combustion zone 38 and a second combustion zone 40. The fuel supply 16 is divided into a first portion of fuel 41 and a second portion of fuel 42 and the air supply 18 is divided into a first portion of combustion air 44 and a second portion of combustion air 46. The first portion of fuel 41 and first portion of combustion air 44 are introduced to the first combustion zone 38 of the combustion unit. The second portion of fuel 42 and second portion of combustion air 46 are introduced downstream of the first combustion zone 38 and prior to the second combustion zone 40 to produce a fuel-rich environment in the second combustion zone 40. Fuel-rich environments are defined as having equivalence ratio values of more than one, where the equivalence ratio is the ratio of the actual fuel-air ratio to the stoichiometric fuel-air ratio. As mentioned previously, the fuel is not completely combusted when staging conditions create a fuel rich environment, resulting in an increase in unburned carbon in the fly ash and therefore increased removal of mercury from the flue gas 20.

Overfire air (FIG. 7) is another type of staging condition that may be used in the combustion unit 12. The air supply 18 is divided into a first portion of combustion air 44 and a second portion of combustion air 46 (also called overfire air). The first portion of combustion air 44 is introduced into a first combustion zone 38 in the combustion unit 12, combusting at least a portion of the original fuel supply 16. The second portion of combustion air 46 is introduced downstream of the first combustion zone 38. As in reburning, air staging (overfire air) results in incomplete fuel combustion and thus increases the removal of mercury from the flue gas 20.

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description therein, may suggest themselves to those skilled in the art without departing from the spirit of the present invention and/or the scope of the appended claims.

EXAMPLE

A 1.0 MMBtu/hr Boiler Simulator Facility was used to determine the effect of combustion staging, additive introduction, and activated carbon introduction on mercury removal in an accurate sub-scale simulation of flue gas temperatures and compositions normally found in a full-scale boiler. The BSF includes a burner, vertically down-fired radiant furnace, horizontal convective pass extending from furnace, and a baghouse and electrostatic precipitator for fly ash control.

The burner is a variable swirl diffusion burner with an axial fuel injector, primary axial air injector, and a secondary radial air injector. Numerous access points along the axis of the facility allow access for supplementary equipment such as reburn injectors, additive injectors, overfire air injectors, and sampling probes.

The radiant furnace is constructed of eight modular refractory lined sections with an inside diameter of 22 inches and a total height of 20 feet. The convective pass is also refractory lined, and contains air-cooled tube bundles to simulate the superheater and reheater sections of a utility boiler. Heat extraction in radiant furnace and convective pass can be controlled such that the residence time-temperature profile matches that of a typical full-scale boiler. A suction pyrometer is used to measure furnace gas temperatures.

The particulate control device is an electrostatic precipitator, consisting of a single-field down-flow unit of 12 tubes with axial corona electrodes. Mercury concentration was measured at the outlet of the electrostatic precipitator using an online mercury analyzer from PS Analytical, capable of measuring both elemental ($Hg^0$) and total mercury in flue gas. Oxidized mercury ($Hg^{+2}$) was determined by the difference between the total and elemental mercury.

Seven bituminous and Powder River Basin (PRB) coals were tested in the Boiler Simulator Facility. The carbon in ash content was controlled using two approaches: coal reburn and staging air. As described previously, coal reburn is a two-stage fuel injection technique in which a portion of the fuel is diverted above the first combustion zone (stoichiometric ratio SR1) to produce a slightly fuel-rich environment. Part of the combustion air is also diverted downstream of the reburn fuel injection to complete combustion in the second combustion zone (stoichiometric ratio SR2). Combustion occurs in the fuel-rich or near-stoichiometric conditions characterized by SR1 while combustion conditions following injection of the second portion of combustion air are fuel-lean and characterized by SR2.

Figure 9:
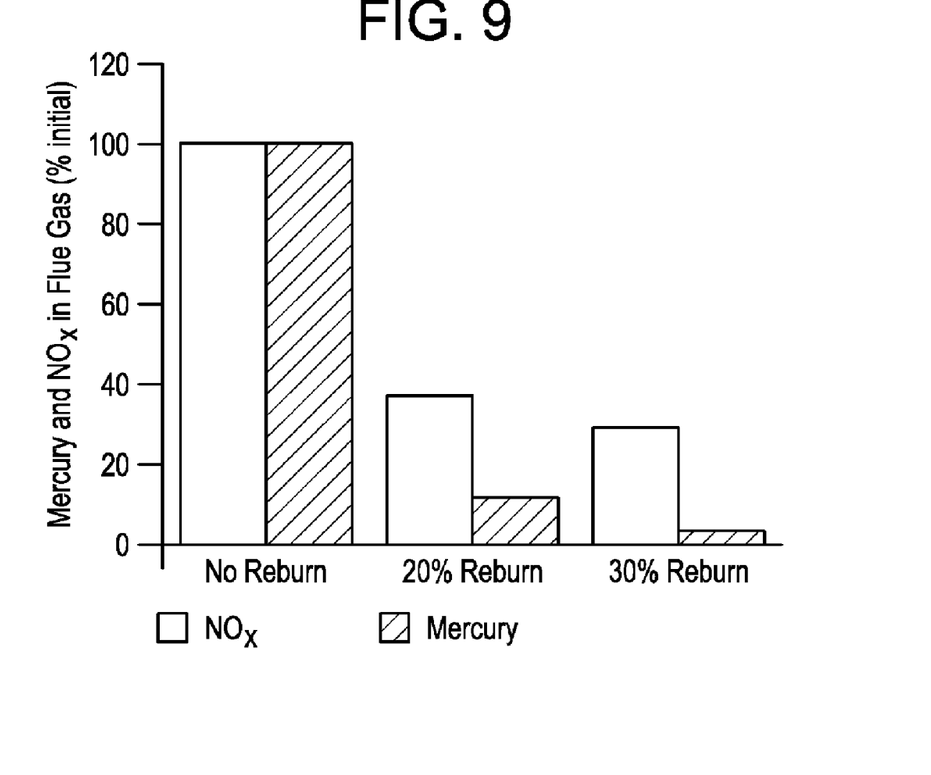
FIG. 9 is a graph showing the effect of coal reburn on mercury and NOx emissions.

FIG. 9 illustrates the effect of coal reburn on mercury removal, measured as the difference between total mercury introduced and measured mercury in the flue gas at the outlet of the electrostatic precipitator. Coal reburn significantly reduced the levels of NOx and mercury emissions from the combustion of Bituminous coals, demonstrating that removal of mercury by fly ash increases when coal reburn are used.

Figure 10:
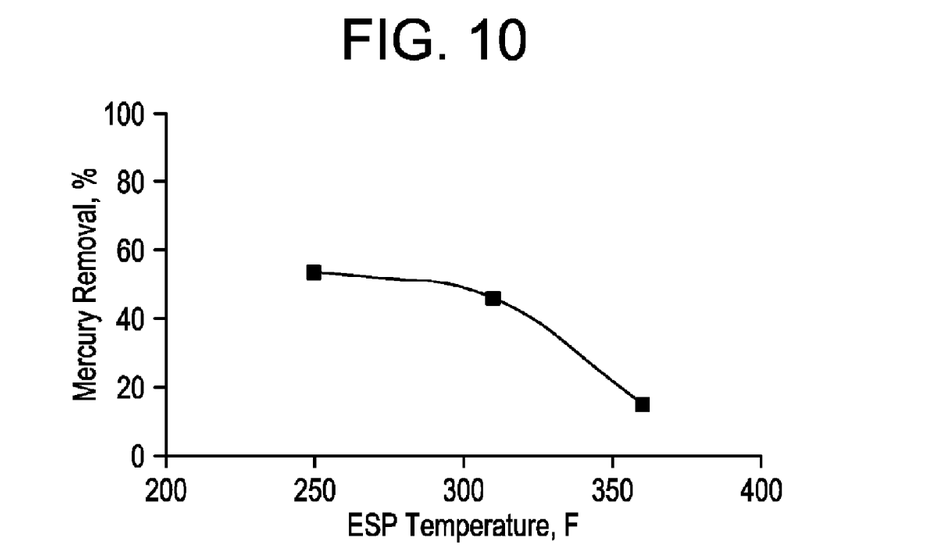
FIG. 10 is a graph showing the effect of the electrostatic precipitator's temperature on mercury removal.

FIG. 10 illustrates the effect of the electrostatic precipitator temperature on mercury removal. By decreasing the temperature of the electrostatic precipitator, mercury removal was significantly increased.

Figure 11:
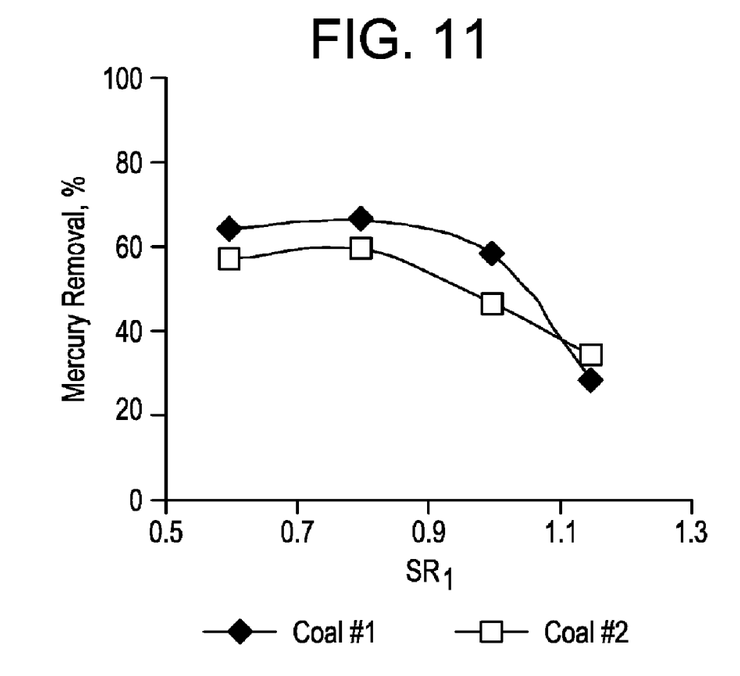
FIG. 11 is a graph showing the effect of stoichiometric ratio of the first combustion zone on mercury oxidation.

FIG. 11 illustrates the effect of the stoichiometric ratio SR1 on mercury oxidation and removal for air staging. Increasing the air diverted from the main combustion zone decreased SR1. Optimal mercury oxidation was achieved at an SR1 of approximately 0.8.

Figure 12:
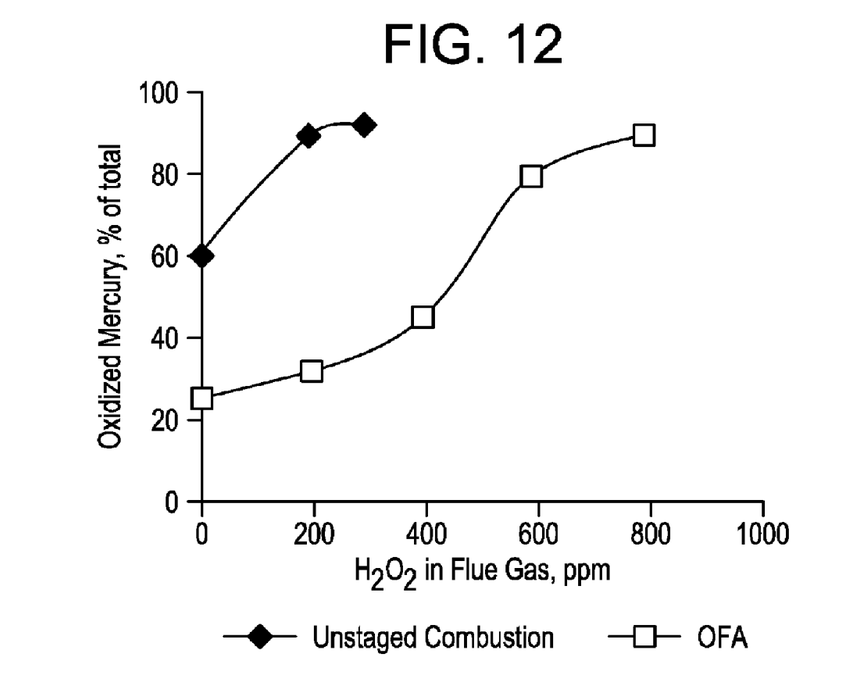
FIG. 12 is a graph showing the effect of $H_2O_2$ on mercury oxidation under both unstaged and staged combustion.

FIG. 12 illustrates the effect of introducing a mercury-oxidizing additive on mercury oxidation in flue gas. $H_2O_2$ was introduced and the concentration of $Hg+^2$ in the flue gas was measured at the outlet of electrostatic precipitator. The concentration of oxidized mercury increased when $H_2O_2$ was added under both un-staged and air staged conditions. Under air staged conditions, the flue gas concentration of $H_2O_2$ required to achieve the same result as un-staged conditions was significantly lower.

Figure 13:
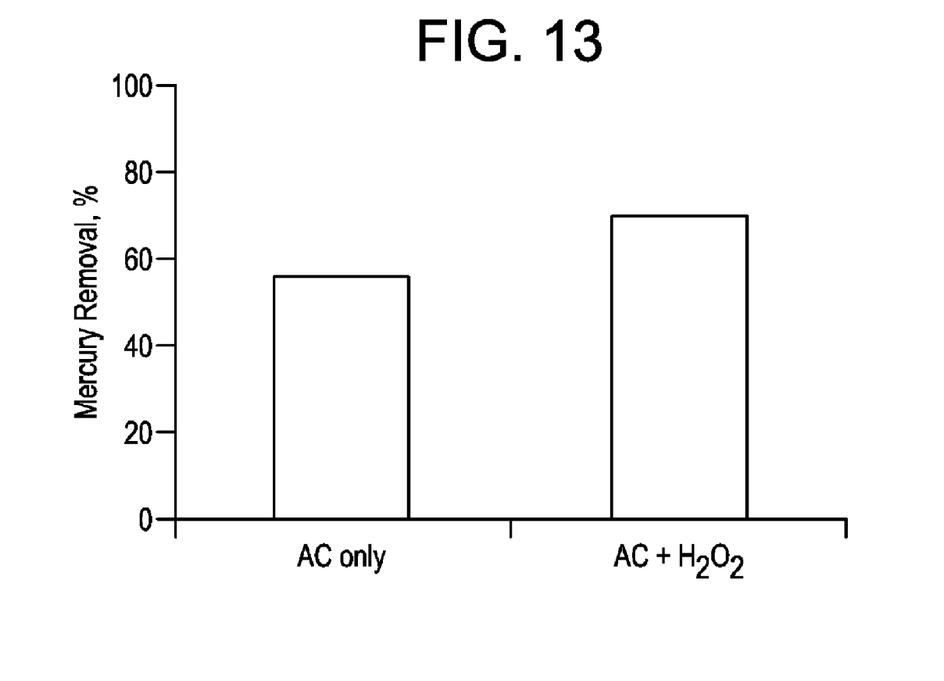
FIG. 13 is a graph showing the efficiency of mercury removal by activated carbon both without and with $H_2O_2$.
Figure 14:
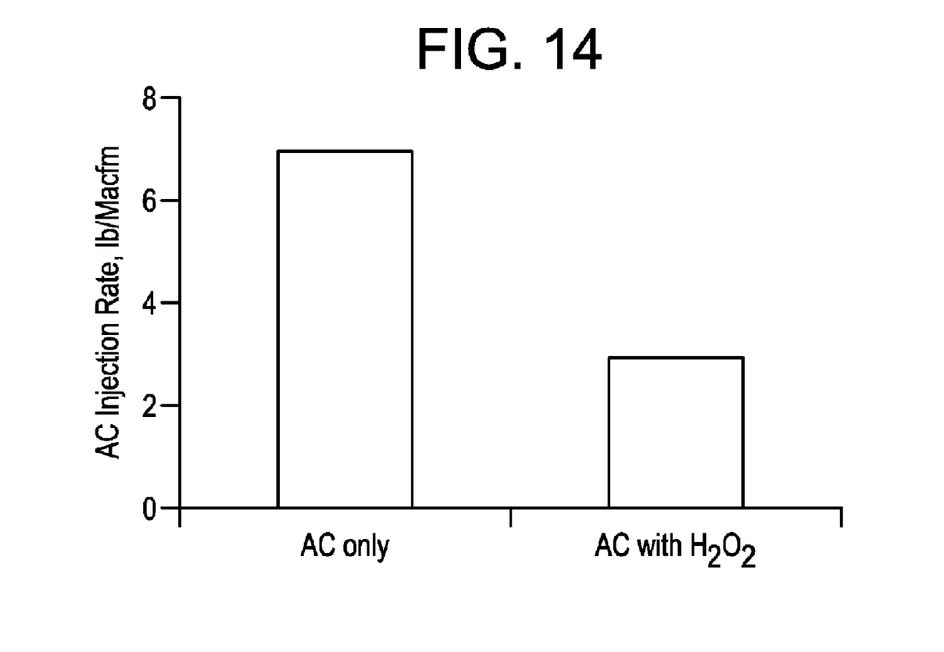
FIG. 14 is a graph showing the required activated carbon injection rate to achieve a set efficiency or mercury removal both without and with $H_2O_2$.

FIG. 13 and FIG. 14 illustrate the effect of introducing activated carbon both without and with a mercury-oxidizing additive on mercury removal. $H_2O_2$ was injected at 750°°F. to a flue gas at a concentration of 200 ppm while activated carbon was injected upstream of the electrostatic precipitator and downstream of the $H_2O_2$ at a rate of 3 lb/Macf (Million Actual Cubic Feet). Mercury removal was improved with the addition of both $H_2O_2$ and activated carbon. Additionally, a significantly lower activated carbon injection rate was needed with the addition of $H_2O_2$ than without $H_2O_2$ to achieve the same mercury removal efficiency.

Surprisingly, the requirements for oxidizing additives and activated carbon are reduced by integrating technologies to control mercury emissions. Both combustion optimization and staging improve mercury oxidation and removal. Moreover, the integrated technologies also contribute to the reduction of NOx and CO emissions while improving the boiler heat rate.

These results indicate that integration of combustion staging, additive injection, and activated carbon injection reduces the need for additives and activated carbon and results in a more effective and efficient mercury removal system.

It should be understood that the foregoing relates to particular embodiments of the present invention, and that numerous changes may be made therein without departing from the scope of invention as defined in the claims.

What is claimed is:

1. Method for reducing mercury gas emissions from a coal-fired combustion system comprising a coal combustion unit and a first particulate control device downstream of the coal combustion unit, the method comprising the steps of:
   combusting coal in the combustion unit under staging conditions so that coal combustion is incomplete resulting in increased carbon in ash content;
   releasing mercury into the flue gas generated by coal combustion;
   introducing at least one mercury-oxidizing additive into the flue gas downstream of the combustion unit and upstream of the first particulate control device for increasing oxidation of mercury in the flue gas;
   removing at least one portion of the mercury by fly ash in the flue gas; and
   collecting the fly ash and associated mercury with the first particulate control device.

2. Method as in claim 1 further comprising the step of cooling the flue gas downstream of the combustion unit and upstream of the first particulate control device to cool the flue gas for increasing mercury removal by carbon in fly ash.

3. Method as in claim 2 wherein the step of cooling the flue gas comprises humidification.

4. Method as in claim 1 wherein the concentration of carbon in the fly ash is in the range of about 0.5% to about 50%.

5. Method as in claim 1 wherein the concentration of carbon in the fly ash is preferably in the range of about 5% to about 15%.

6. Method as in claim 1 wherein the step of combusting coal in the combustion unit under staging conditions comprises coal reburning to produce a fuel-rich environment.

7. Method as in claim 6 wherein the coal reburning comprises introducing a first portion of combustion air into a first combustion zone in the combustion unit, combusting a first portion of fuel in the first combustion zone, introducing a second portion of fuel downstream of the first combustion zone to produce a fuel-rich environment for combusting the second portion of fuel in a second combustion zone and introducing a second portion of combustion air downstream of the second portion of fuel to complete combustion.

8. Method as in claim 1 wherein the step of combusting coal in the combustion unit under staging conditions comprises air staging.

9. Method as in claim 8 wherein the air staging comprises introducing a first portion of combustion air into a first combustion zone in the combustion unit, combusting fuel in the first combustion zone, introducing a second portion of combustion air downstream of the combustion zone to complete combustion.

10. Method as in claim 1 wherein the at least one mercury-oxidizing additive is selected from the group consisting of $H_2O_2$, $NH_4Cl$, and $CH_3OH$.

11. Method as in claim 1 wherein the at least one mercury-oxidizing additive is selected from halogen-containing species.

12. Method as in claim 1 further comprising the step of optimizing combustion of coal in the combustion unit under staging conditions for minimizing CO, NOx and mercury emissions.

13. Method as in claim 12 wherein the step of optimizing combustion of coal in a combustion unit under staging conditions comprises sensing CO distribution in the flue gas and controlling introduction of fuel and combustion air into the combustion unit based on the CO distribution.

14. Method as in claim 13 wherein the step of controlling introduction of fuel and combustion air comprises controlling introduction of fuel with coal dampers and introduction of combustion air with air flow actuators.

15. Method as in claim 1 wherein the step of combusting coal in the combustion unit under staging conditions comprises coal reburning to produce a fuel-rich environment.

16. Method as in claim 1 wherein the step of combusting coal in the combustion unit under staging conditions comprises air staging.

17. Method as in claim 1 further comprising the step of cooling the flue gas downstream of the combustion unit and upstream of the first particulate control device to cool the flue gas for increasing mercury removal by carbon in fly ash.

18. Method as in claim 17 wherein the step of combusting coal in the combustion unit under staging conditions comprises coal reburning to produce a fuel-rich environment.

19. Method as in claim 17 wherein the step of combusting coal in the combustion unit under staging conditions comprises air staging.

20. Method as in claim 17 wherein the coal-fired combustion system comprises a second particulate control device and the method further comprises the step of introducing activated carbon downstream of the first particulate control device and upstream of the second particulate control device.

21. Method as in claim 20 wherein the step of combusting coal in the combustion unit under staging conditions comprises coal reburning to produce a fuel-rich environment.

22. Method as in claim 20 wherein the step of combusting coal in the combustion unit under staging conditions comprises air staging.

23. Method as in claim 1 wherein the coal-fired combustion system comprises a second particulate control device and the method further comprises the step of introducing activated carbon downstream of the first particulate control device and upstream of the second particulate control device.

24. Method as in claim 23 wherein the step of combusting coal in the combustion unit under staging conditions comprises coal reburning to produce a fuel-rich environment.

25. Method as in claim 23 wherein the step of combusting coal in the combustion unit under staging conditions comprises air staging.

26. Method as in claim 1 wherein the coal-fired combustion system comprises a second particulate control device and the method further comprises the step of introducing activated carbon downstream of the first particulate control device and upstream of the second particulate control device.

27. Method as in claim 26 wherein the step of combusting coal in the combustion unit under staging conditions comprises coal reburning to produce a fuel-rich environment.

28. Method as in claim 26 wherein the step of combusting coal in the combustion unit under staging conditions comprises air staging.

29. Method for reducing mercury gas emissions from a coal-fired combustion system comprising a coal combustion unit and a first particulate control device downstream of the coal combustion unit, the method comprising the steps of:

combusting coal in the combustion unit under staging conditions so that mercury is released into flue gas generated by coal combustion and at least one portion of the mercury is removed by fly ash in the flue gas;

introducing activated carbon into the flue gas upstream of the first particulate control device, the activated carbon removing at least a second portion of the mercury; and collecting the fly ash, activated carbon, and associated first and second portions of mercury with the first particulate control device.

30. Method as in claim 29 further comprising the step of introducing at least one mercury-oxidizing additive into the flue gas downstream of the combustion unit and upstream of the activated carbon introduction and the first particulate control device for increasing oxidation of mercury in the flue gas.

31. Method as in claim 30 wherein the at least one mercury-oxidizing additive is selected from the group consisting of $H_2O_2$, $NH_4Cl$, and $CH_3OH$.

32. Method as in claim 30 wherein the at least one mercury-oxidizing additive is selected from halogen-containing species.

33. Method as in claim 30 further comprising the step of cooling the flue gas downstream of the combustion unit and upstream of the activated carbon introduction and the first particulate control device to cool the flue gas for increasing removal of the second portion of mercury by the activated carbon.

34. Method as in claim 33 wherein the step of cooling comprises humidification.

35. Method as in claim 33 wherein the step of combusting coal in the combustion unit under staging conditions comprises coal reburning to produce a fuel-rich environment.

36. Method as in claim 33 wherein the step of combusting coal in the combustion unit under staging conditions comprises air staging.

37. Method as in claim 33 wherein the coal-fired combustion system comprises a second particulate control device wherein the activated carbon is injected downstream of the first particulate control device and upstream of the second particulate control device.

38. Method as in claim 37 wherein the step of combusting coal in the combustion unit under staging conditions comprises coal reburning to produce a fuel-rich environment.

39. Method as in claim 37 wherein the step of combusting coal in the combustion unit under staging conditions comprises air staging.

40. Method as in claim 37 further comprising the step of optimizing combustion of coal in the combustion unit under staging conditions for minimizing CO, NOx and mercury emissions.

41. Method as in claim 40 wherein the step of combusting coal in the combustion unit under staging conditions comprises coal reburning to produce a fuel-rich environment.

42. Method as in claim 40 wherein the step of combusting coal in the combustion unit under staging conditions comprises air staging.

43. Method as in claim 29 further comprising the step of cooling the flue gas downstream of the combustion unit and upstream of the activated carbon introduction and the first particulate control device to cool the flue gas for increasing removal of the second portion of mercury by the activated carbon and fly ash.

44. Method as in claim 43 wherein the step of cooling the flue gas comprises humidification.

45. Method as in claim 29 wherein the coal-fired combustion system comprises a second particulate control device wherein the activated carbon is introduced into the flue gas downstream of the first particulate control device and upstream of the second particulate control device.

46. Method as in claim 45 wherein the step of optimizing combustion of coal in a combustion unit under staging conditions comprises sensing CO distribution in the flue gas and controlling introduction of fuel and combustion air into the combustion unit based on the CO distribution.

47. Method as in claim 46 wherein the step of controlling introduction of fuel and combustion air comprises controlling introduction of fuel with coal dampers and introduction of combustion air with air flow actuators.

48. Method as in claim 29 further comprising the step of optimizing combustion of coal in the combustion unit under staging conditions for minimizing CO, NOx and mercury emissions.

49. Method as in claim 29 wherein the step of combusting coal in the combustion unit under staging conditions comprises coal reburning to produce a fuel-rich environment.

50. Method as in claim 49 wherein the coal reburning comprises introducing a first portion of combustion air into a first combustion zone in the combustion unit, combusting a first portion of fuel in the first combustion zone, introducing a second portion of fuel downstream of the first combustion zone to produce a fuel-rich environment for combusting the second portion of fuel in a second combustion zone and introducing a second portion of combustion air downstream of the second portion of fuel to complete combustion.

51. Method as in claim 29 wherein the step of combusting coal in the combustion unit under staging conditions comprises air staging.

52. Method as in claim 51 wherein the air staging comprises introducing a first portion of combustion air into a first combustion zone in the combustion unit, combusting fuel in the first combustion zone, introducing a second portion of combustion air downstream of the combustion zone to complete combustion.

* * * * *